United States Patent Office 3,222,361
Patented Dec. 7, 1965

3,222,361
18-ETHYLENEDIOXY-17-ISOPREGNENES AND DERIVATIVES THEREOF
Albert Wettstein, Riehen, and Julius Schmidlin, Basel, Switzerland, assignors to Ciba Corporation, New York, N.Y., a corporation of Delaware
No Drawing. Filed Nov. 6, 1962, Ser. No. 235,851
Claims priority, application Switzerland, Nov. 17, 1961, 13,385/61
7 Claims. (Cl. 260—239.55)

The present invention provides a process for the manufacture of 11β-hydroxy-18-oxopregnane compounds and of their cyclohemiacetals. This group of compounds comprises valuable physiologically active substances, for example aldosterone.

One important problem in the synthesis of aldosterone and other steroids of similar constitution is the formation of the 11β-hydroxy-18-aldehyde grouping on ring C which is typical of this group of substances. The reactive behaviour of said grouping is represented below by the cyclohemiacetal form II which is tautomeric to the open form I

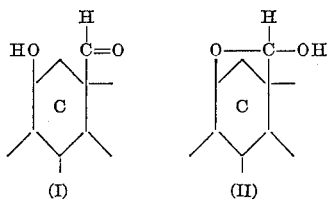

Various solutions to this problem have already been suggested: Thus, for example, according to a known process in a first step an (18→11β)-lactone of an 11β:21-dihydroxysteroid-18-acid is prepared and in it any oxo groups present, for example, in positions 3 and 20, are protected by ketalization and the lacetone group is then reduced to the cyclohemiacetal group. In the further processing of the direct reduction product to form the desired cyclohemiacetal with free oxo groups (for example in positions 3 and 20) by acid treatment, the achievement of a good yield requires previous esterification of the hydroxyl groups in positions 18 and 21. According to another method the afore-mentioned cyclohemiacetals are obtained by oxidative degradation of 11β:18α-oxido-18:18-ethylidenesteroids which themselves can be totally synthesized only by cumbersome operations. Compared with the complicated nature of said processes and the relatively small total yield, it is an advance in the art that the present process now makes it possible to prepare the desired hydroxyaldehyde-cyclohemiacetals in a simple manner from starting materials that are readily accessible by total synthesis or more especially by partial synthesis.

According to the new process a saturated or unsaturated 20-ketal of an 18:20-dioxopregnane compound, which contains in position 11 a free α-hydroxyl group or an esterified α- or β-hydroxyl group, or an oxo group, is treated in an anhydrous non-acidic organic solvent with a strong acid, whereupon in the 18-acetal so formed the 11-oxygen function is converted if desired after reketalizing the liberated 20-oxo group in known manner into an 11β-hydroxyl group, and in the resulting compound ketal and acetal groups are subjected to acid hydrolysis or split hydrogenolytically. The advantage of this combination method resides above all in the fact that it makes it possible to convert industrially important starting materials, which are easy to prepare from 11-oxotigogenin or 11α-hydroxyprogesterone or 11α-acetoxyprogesterone, into 18-oxosteroids containing an 11β-hydroxyl group.

The first step of the process is based on the unexpected observation that it is possible to acetalize the 18-oxo group in the afore-mentioned 20-ketals by treatment with a strong acid in an anhydrous, non-acidic organic solvent so as to undergo an intramolecular exchange reaction. It is of advantage to use as acid an organic sulfonic acid such, for example as benzenesulfonic, para-toluenesulfonic or methanesulfonic acid, or a Lewis acid such as boron trifluoride or ferric chloride. Likewise suitable are inorganic acids such as sulfuric or perchloric acid, also strong organic carboxylic acids such as trichloroacetic or trifluoroacetic acid. Particularly suitable solvents are aromatic hydrocarbons, for example benzene or toluene, also halogenated aliphatic hydrocarbons such as dichloromethane, trichloromethane or 1:2-dichloroethane, furthermore lower alkanols, preferably dihydric alkanols such as ethane-1:2-diol or propane-1:2-diol and alkanolthiols such as monothioglycol.

The primarily formed reaction products are compounds containing a free 20-oxo group which may be isolated as such or, if desired, ketalized under the action of the acid present by the alkanol which may already be present in, or may have subsequently been added to, the reaction medium. It is of advantage to remove the water formed continuously from the reaction mixture, for example by azeotropic distillation. When the 20-oxo-group is allowed to react further with alkanol, this latter may be identical with, or different from, that forming the ketal group in the starting 20-ketal. Reketalization of the 20-oxo group yields as a rule, in addition to the desired product with unchanged configuration of the side chain, also the corresponding 17-epimeric compound. The ratio in which the two substances are formed can be substantially varied by a suitable selection of the reaction conditions. Thus, for example, when the starting material used is a pregnane compound having the 17β-configuration of the side chain, and is treated for a prolonged period at an elevated temperature, the formation of the thermodynamically more stable reaction products epimeric in 17-position is favored. This epimerization, taking place in an acidic medium, renders the compounds of the two configurative series easily accessible.

The conversion of the 11-oxygen function in the resulting 18-acetals into the 11β-hydroxyl group is performed in known manner: Acetals containing an 11α-acyloxy and an 11β-acyloxy group are subjected to alkaline hydrolysis or to reductive scission with light metal hydrides, whereupon the 18-acetals of 11α-hydroxy compounds obtained in this manner or directly are dehydrogenated in a nonacidic medium, for example with chromium trioxide in pyridine, and the 11-oxopregnanes, obtained in this manner or directly, are then reduced. If there is need to protect double bonds present, the reduction is preferably performed with complex light metal hydrides. Thus, for example, 18-acetals of 11:18-dioxopregnanes can be reduced with lithium aluminum hydride or sodium borohydride to the corresponding 11β-hydroxy-18-acetals, the yield being approximately quantitative.

The 18-aldehyde group is finally liberated by way of an acid hydrolysis, using a mineral acid in the presence of a solution promoter such as acetone, tetrahydrofuran or dioxane, or a lower aliphatic carboxylic acid in the presence of water. According to a special variant the acetal to be split up is treated simultaneously with a lower aliphatic carboxylic acid and a strong inorganic acid. Thus, for example, treatment with acetic acid and perchloric acid gives an exellent yield of mixtures containing the expected cyclohemiacetal and the corresponding cyclohemiacetal acetate. By acylation or hydrolysis such mixtures can be worked up in known manner to yield a unitary product, i.e., either pure, free cyclohemiacetal or one of its esters. The reductive scission of any present monothioacetal or monothioketal groups is advantageously performed before proceeding to the hydrolysis of the ordinary acetal or ketal radicals respectively, for example with Raney nickel in acetone.

In the pregnane compounds to be used as starting materials—including also those of the 19-nor series—there may be present in addition to the afore-mentioned substituents, in the nucleus or in the side chain or in the angular methyl group in position 10, further substituents, for example free or functionally converted hydroxyl or oxo groups, alkyl such as methyl groups, or halogen atoms, for example in positions 1, 2, 4, 5, 6, 7, 8, 9, 10, 12, 14, 15, 16, 17 and 21. The starting materials may belong to the 5α-series or to the 5β-series and/or they may contain double bonds, for example in positions (1:2), 4(5), 5(6) and 16(17).

The starting materials can be prepared, for example, from the 3:20-diketals of 11:18-dihydroxypregnenes and 11-acyloxy-18-hydroxypregnenes described in patent applications Ser. No. 845,095, filed October 8, 1959, now U.S. Patent No. 3,178,346, by Albert Wettstein et al., Ser. No. 52,049, filed August 26, 1960, now U.S. Patent No. 3,135,773, by Albert Wettstein et al., and Ser. No. 52,023, filed August 26, 1960, now U.S. Patent No. 3,081,298, by Albert Wettstein et al., by dehydrogenation, for example with chromic acid+pyridine complex, and, in the given case, subsequent alkaline hydrolysis of the 11α-acyloxy group or partial acid hydrolysis of the ketal group in position 3.

Quite generally, there are suitable as starting materials both "open" ketals and cyclic ketals; the latter, more especially those which are derived from lower glycols, are to be given preference because of the ease with which they can be split.

The products of the invention are physiologically active or constitute valuable intermediates for the manufacture of therapeutically valuable steroids. *Inter alia*, the aldosterone obtained by the present process and its esters and its analogues, for example the 18(11)-cyclohemiacetals of $\Delta^4$-3:18:20-trioxo-11β-hydroxypregnene and of $\Delta^4$-3:18:20-trioxo-11β:17α-dihydroxypregnene, can be used for the therapeutic treatment of shock and related circulatory disturbances. In 18(11)-cyclohemiacetals not containing the groups required for developing a physiological action, obtained by the present process, said groups can be subsequently introduced by known methods or they can be formed by modifying existing substituents. Thus, for example, a 3-hydroxyl group can be dehydrogenated to form an oxo group, if desired after having first blocked the 18-hydroxyl group, for example by acylation or etherification. A 4(5)-double bond can be introduced in the last-mentioned 3-oxo compounds by bromination in position 4 and dehydrobromination, for example by means of a tertiary base; alternatively, dehydrogenation is performed simultaneously in positions 1(2) and 4(5) by means of selenium dioxide or by enzymatic methods. A 21-hydroxyl group can be advantageously introduced by enzymatic oxidation, for example with Wojnowicia graminis or Ophiobolus herpotrichus.

The present invention also comprises the group of compounds consisting of 20-ketals of saturated and unsaturated 3-oxygenated 18:20-dioxo-pregnanes which are unsubstituted in 21-position and have in 11-position a free 11α-hydroxyl group or an esterified 11α-hydroxyl or 11β-hydroxyl group or an oxo group, and of 18-acetals of a saturated or unsaturated 3-oxygenated 18:20-dioxopregnane and of 3-oxygenated saturated or unsaturated 18-acetals of 20-ketals of 18:20-dioxo-pregnane compounds having the same substituents in 11-position and the corresponding 17-iso derivatives. The 3-oxygen function may be a free or functionally converted hydroxyl group, especially esterified or etherified hydroxyl group, or more especially a free or ketalized oxo group. These compounds are important intermediates for the synthesis of 18-oxygenated pregnane compounds as is apparent from the above description.

The following examples illustrate the invention.

*Example 1*

20 cc. of an 0.001-molar solution of para-toluene-sulfonic acid monohydrate are dehydrated in a distillation apparatus by dropping in, and at the same time distilling off, 10 cc. of anhydrous benzene at a bath temperature of 100 to 110° C. With exclusion of moisture, 430 mg. of d:l-3:3;20:20 - bisethylenedioxy - 11:18-dioxo-$\Delta^5$-pregnene are added, and while continuously stirring another 30 cc. of anhydrous benzene are dropped in and distilled off in the course of 30 minutes. The whole is allowed to cool with exclusion of moisture, 20 cc. of 0.1 N-sodium bicarbonate solution are added at 0 to 3° C., and the whole is repeatedly agitated with benzene. The benzene extract is washed with water, dried with sodium sulfate and evaporated under vacuum. The crude product is transferred to 240 sheets of whatman paper No. 1 (18.5 x 45 cm.; washed with methanol and chloroform) impregnated with a 1:4-mixture of formamide and acetone and chromatographed in the system formamide+cyclohexane. The chromotogram is allowed to run "down to the bottom" and the zone of $R_f$=0.20 to 0.33 (localized by cutting out narrow strips which are sprinkled with aqueous glycollic acid of 50% strength, dried at 80° C. and then photocopied in ultraviolet light) is cut out, and the paper is dried for 16 hours in a high vacuum and then eluted successively with 20% aqueous tetrahydrofuran, 50% aqueous tetrahydrofuran and then with undiluted tetrahydrofuran. The eluate is concentrated under vacuum to about 20 cc., and the concentrate is saturated with sodium chloride and agitated with benzene. The benzene extract is washed with water, dried with sodium sulfate, concentrated, and then filtered through a column of 250 mg. of active carbon pasted with benzene. The filtrate is evaporated under vacuum; the residue is recrystallized from tetrahydrofuran-ether and yields 286 mg. of pure d:l-3:3;18:18-bisethylenedioxy-11:20-dioxo-$\Delta^5$-pregnene melting at 213.5–218° C.

A solution of 86 mg. of d:l-3:3;18:18-bisethylenedioxy-11:20-dioxo-$\Delta^5$-pregnene in 5 cc. of anhydrous tetrahydrofuran is mixed with 3 cc. of molar lithium aluminum hydride solution in tetrahydrofuran and the whole is stirred under dry nitrogen for 14 hours at room temperature. The reaction batch is poured into a mixture of 3 cc. of N-potassium acetate solution, 9.6 cc. of 0.5 N-tartaric acid solution and 10 grams of ice (with flushing with 5 cc. of tetrahydrofuran), and the tetrahydrofuran is removed by concentration in an oil pump vacuum. The aqueous residue is agitated with methylene chloride, and the extract is washed with molar potassium-sodium tartrate solution and a 4-molar solution of sodium chloride, dried with sodium sulfate and evaporated under vacuum. The crude product (78 mg.) consists of a mixture of the diols epimeric in position 20; it can be hydrolyzed as it is without previous purification.

For this purpose the resulting crude hydrogenation product is heated in 5.0 cc. of acetic acid of 67% strength for 15 minutes at 95-100° C. The cooled solution is evaporated under vacuum, the residue is taken up in a 1:3-mixture of methylene chloride and ether, the extract is deacidified with 0.2 N-sodium bicarbonate solution, and the solution is washed with water, dried with sodium sulfate and evaporated under vacuum. The crude hydrolysis product is separated on 60 sheets of whatman paper No. 1 (18.5 x 45 cm.; washed with methanol and chloroform), impregnated with formamide+acetone (2:3) in the solvent system formamide/cyclohexane-benzene (4:1). The chromatogram runs "down to the bottom"; it is allowed to dry in air, and the two zones absorbing in ultra-violet light, having the $R_f$ values 0.37–

0.46 and respectively 0.28–0.36, are each eluted successively with 20% aqueous tetrahydrofuran, 50% aqueous tetrahydrofuran and undiluted tetrahydrofuran. The extracts are concentrated under vacuum to a few cc. each, and the aqueous residues are extracted with benzene. The extracts are washed with a small amount of 4-molar sodium chloride solution, dried with sodium sulfate and concentrated to 5 and respectively 2.5 cc.; the concentrates are filtered through a layer of 100 and respectively 50 mg. of active carbon, and the filtrates are evaporated under vacuum. The eluate of the lower zone yields from tetrahydrofuran+ether 31.6 mg. of d:l-3-oxo-11$\beta$:18;18:-20$\beta$-bisoxido - $\Delta^4$ - pregnene. After another recrystallization from tetrahydrofuran+hexane, the product melts at 199–201° C. The eluate of the upper zone yields from tetrahydrofuran+ether 9.6 mg. of crystalline d:l-3-oxo-11$\beta$:18;18:20$\alpha$-bisoxido-$\Delta^4$-pregnene which, on further recrystallization from tetrahydrofuran+hexane, melts at 202–206° C.

The starting material used in the above example is prepared in the following manner:

1.074 grams of crude d:l-3:3;20:20-bisethylenedioxy-11$\beta$:18-dihydroxy-$\Delta^5$-pregnene in 12.5 cc. of pyridine are mixed with a separately prepared solution of 1.50 grams of chromium trioxide in 0.75 cc. of water and 74.3 cc. of pyridine, and the whole is stirred for 24 hours at room temperature. The reaction mixture is then evaporated under vacuum and the initially resinous residue is extracted with a total of 200 cc. of tetrahydrofuran with simultaneous trituration. The extracts are successively filtered through a combined column prepared in tetrahydrofuran; the bottom of the column consists of 1.25 grams of active carbon and its top of 0.625 gram of purified kieselguhr. The collected yellow filtrate gives on evaporation a blackish brown residue which crystallizes substantially quantitatively from ether and is freed in this form from the entrained pyridine under a high vacuum. One recrystallization from a 1:2-mixture of tetrahydrofuran and ether yields 732 mg. of slightly beige-tinged small scales of the oxidation product which is substantially unitary according to its paper-chromatogram. The crystallizate is dissolved in 50 cc. of benzene, the solution filtered through a column of 730 mg. of active carbon, the colorless filtrate is evaporated under vacuum and the residue recrystallized from methylene chloride+acetone, to yield 688 mg. of pure d:l-3:3;20:20-bisethylenedioxy-11:18-dioxo-$\Delta^5$-pregnene in colorless flakes melting at 190–205°/232.5–234.5°/C.

*Example 2*

A suspension of 263 mg. of d:l-3:3;20:20-bisethylenedioxy-11:18-dioxo-$\Delta^5$-pregnene in 92 cc. of an 0.002-molar solution of para-toluenesulfonic acid monohydrate in anhydrous ethylene glycol is heated under an oil pump vacuum to 85–90° C.; when the starting material has dissolved, the glycol is distilled off under a pressure of about 0.5 mm. Hg in the course of another two hours to a residual volume of about 2.5 cc. After cooling, the residue is alkalinized with 0.2-molar sodium bicarbonate solution and extracted with methylene chloride. The extract is washed with water, dried with sodium sulfate and evaporated. On recrystallization from ether, the crude product yields 195 mg. of a crystallizate consisting of two components that are of distinctly different morphological characteristics, and in addition 105 mg. of evaporated mother liquor (which is worked up as described below). The above crystallizate is dissolved in 10 cc. of tetrahydrofuran, the solution is transferred to 100 sheets of whatman paper No. 1 (18 x 45 cm.; washed with methanol and chloroform) impregnated with a 1:4-mixture of formamide and acetone and chromatographed in the system formamide-cyclohexane. The chromatogram is allowed to run "down to the bottom" and allowed to dry in air in a darkened fume cupboard; the two zones of $R_f$ value 0.20–0.33 and respectively 0.44–0.83 (localized by cutting out narrow strips and treating them with glycollic acid), allowed to dry for 16 hours in a high vacuum and then eluted successively with 20% aqueous tetrahydrofuran, 50% aqueous tetrahydrofuran and then with undiluted tetrahydrofuran. Each of the two eluates is concentrated under vacuum to a few cc., the concentrates are saturated with sodium chloride and agitated with benzene. The extracts are washed with a small amount of water, dried with sodium sulfate and concentrated under vacuum. The concentrate is filtered through a column of 100 mg. of active carbon; its upper zone is evaporated and the residue recrystallized from ether containing tetrahydrofuran, to yield a total of 26 mg. of the intermediately formed d:l-3:3;18:18-bisethylenedioxy-11:20-dioxo-$\Delta^5$-pregnene melting at 213:5–218° C. The concentrate of the bottom zone of the paper-chromatogram is clarified with 250 mg. of active carbon, is evaporated under vacuum and the residue is recrystallized from tetrahydrofuran+ether, to yield 91.3 mg. of colorless hexagonal flakes melting at 195.5–198° C., as well as 12.0 mg. of a slightly less pure crystallizate melting at 182.5–192° C. The main fraction is recrystallized with methylene chloride from ether, to yield 83.2 mg. of pure d:l - 3:3;18:18;20:20 - triethylenedioxy - 11 - oxo - $\Delta^5$-17-isopregnene melting at 195.5–200° C.

The evaporation residue of the mother liquor (105 mg.) obtained as described in the first paragraph above is dissolved in 6.0 cc. of tetrahydrofuran and separated like the crystallizate by paper-chromatography in the system formamide/cyclohexane. The zone of $R_f$ 0.58–0.75, localized with glycollic acid, is eluted as described above like the crystalline share of the reaction product, and the concentrated filtrate is extracted with benzene. The benzene solution is dried, concentrated to a volume of 10 cc., clarified with 150 mg. of active carbon, the filtrate is evaporated under vacuum and the residue is dissolved in a few drops of tetrahydrofuran. On addition of ether a total of 20.6 mg. of d:l-3:3;18:18;20:20-triethylenedioxy-11-oxo-$\Delta^5$-pregnene, melting at 178.5–181.5° C., separates out.

A solution of 47.5 mg. of d:l-3:3;18:18;20:20-triethylenedioxy-11-oxo-$\Delta^5$-pregnene in 2.5 cc. of anhydrous tetrahydrofuran, prepared under anhydrous nitrogen, is mixed with 1.5 cc. of a solution of about molar strength of lithium aluminum hydride in tetrahydrofuran, and the batch is stirred for 14 hours at room temperature. While cooling externally with ice, there are then added dropwise within 5 minutes 3.0 cc. of a mixture of ethyl acetate and tetrahydrofuran (which mixture is molar with regard to the ester) and after another 15 minutes 3.0 cc. of a 2.5-molar aqueous tetrahydrofuran solution are added; the whole is then pasted with 250 mg. of kieselguhr and the solid constituents are filtered off. The filtrate is mixed with ether and evaporated under vacuum. The amorphous residue is d:l-3:3;18:18;20:20-triethylenedioxy-11$\beta$-hydroxy-$\Delta^5$-pregnene.

To hydrolyse the crude product (47.5 mg.) it is heated in 2.5 cc. of acetic acid of 67% strength for 15 minutes at 95–100° C. under nitrogen. After cooling, the solution is evaporated under an oil pump vacuum, and the acetic acid retained is removed by distilling off a total of 10 cc. of toluene. The pale-yellow, amorphous residue is dissolved in 2.4 cc. of tetrahydrofuran, transferred to 20 sheets of whatman paper No. 1 (18.5 x 45 cm.; washed with methanol and chloroform) and separated in the system formamide/benzene. The chromatogram, which has run "down to the bottom" is allowed to dry in air. The zone of $R_f$ value 0.15–0.25, which displays strong absorption in ultra-violet light, is eluted successively with 450 cc. of 20% aqueous tetrahydrofuran, 150 cc. of 50% aqueous tetrahydrofuran and 75 cc. of undiluted tetrahydrofuran; the extract is concentrated to 12.5 cc. and the concentrate is saturated with sodium chloride and extracted with benzene. The benzene extract is washed with a small amount of 2.5-molar sodium chloride solution, dried with sodium sulfate and concentrated to about 5 cc., and then clarified by filtration through a layer of 50 mg. of active carbon. On evaporation the filtrate yields a substantially colorless residue which from a small amount of ether yields 10.5 mg. of the (18,11β)-cyclohemiacetal of d:l-3:18:20-trioxo-11β-hydroxy-$\Delta^4$-pregnene (d:l-21-desoxyaldosterone) melting at 205 to 207.5° C.

60.0 mg. of d:l-3:3;18:18;20:20-triethylenedioxy-11-oxo-$\Delta^5$-17-isopregnene are reduced in 3.0 cc. of tetrahydrofuran with 2.0 cc. of a molar solution of lithium aluminum hydride in tetrahydrofuran for 14 hours at room temperature. Working up is performed as described above for the corresponding 17-normal compound. The crude product crystallizes from ether, to yield 25.0 mg. of d:l-3:3;18:18;20:20-triethylenedioxy-11β-hydroxy-$\Delta^5$-17-isopregnene in small colorless needles melting at 132–135.5° C., and in addition 31.0 mg. of amorphous constituents which, according to the infra-red absorption spectrum which is especially characteristic in the region of 8.9 to 11.0μ (strong hydroxyl band at 2.90μ with shoulder at 2.76μ; no band in the carbonyl region) consist substantially of the identical substance.

For hydrolysis the whole batch is heated with 2.5 cc. of acetic acid of 67% strength for 30 minutes at 95–100° C. under nitrogen. The batch is worked up as described in the preceding paragraph, and the crude hydrolysis product is taken up in tetrahydrofuran and purified by distribution chromatography on 20 sheets of whatman paper No. 1 (18.5 x 45 cm.; washed with methanol and chloroform) with the use of the solvent system formamide/cyclohexane-benzene (1:4). From the chromatogram which has run "down to the bottom" the ultraviolet-absorbing zone of $R_f$ 0.13–0.22 is eluted with aqueous tetrahydrofuran and the eluate is concentrated and extracted with benzene. The benzene extract is concentrated to about 10 cc. and then filtered for clarification through a layer of 100 mg. of active carbon, and the filtrate is evaporated under vacuum. The residue crystallizes from ether, to yield 21.7 mg. of the (18,11β)-cyclohemiacetal of d:l-21-desoxy-17-isoaldosterone in colorless, cross-grown prisms melting at 172–176° C.

*Example 3*

108 mg. of d:l-3:3;20:20-bisethylenedioxy-11:18-dioxo-$\Delta^5$-pregnene are covered with 25 cc. of a warm 0.01-molar solution of para-toluenesulfonic acid monohydrate in benzene. The solution is heated and stirred for 1½ hours at 80 to 85° C., allowed to cool, agitated with 0.1 N-sodium bicarbonate solution and a 4-molar solution of sodium chloride, dried with sodium sulfate and evaporated under vacuum. The crude product is dissolved in 6 cc. of tetrahydrofuran and subjected to preparative separation on 60 sheets of whatman paper No. 1 (18.5 x 45 cm.; washed with methanol and chloroform) in the system formamide/cyclohexane-benzene (1:1). The chromatogram is allowed to run "down to the bottom", dried in air, and the two ultraviolet-absorbing zones of $R_f$ 0.55–0.70 and respectively 0.77–0.90 are dried for 16 hours in a high vacuum and then successively eluted each with 850 cc. of 20% aqueous tetrahydrofuran, 750 cc. of 50% aqueous tetrahydrofuran and 250 cc. of undiluted tetrahydrofuran. The eluates are suitably combined, each concentrated to about 5 cc., and the aqueous residues are extracted with benzene. Each benzene extract is washed with a small amount of a 4-molar solution of sodium chloride and concentrated to about 6 cc. under vacuum. The two concentrates are filtered each through a column of 60 mg. of active carbon and the clarified filtrates are evaporated under vacuum. Recrystallization of the residue of the upper zone from tetrahydrofuran + ether yields 27.7 mg. of d:l-3:11:20-trioxo-18:18-ethylenedioxy-$\Delta^4$-pregnene in colorless, glossy crystal clusters melting at 214–221.5° C. The residue of the bottom zone is dissolved in a small amount of tetrahydrofuran, repeatedly mixed with ether and evaporated, to yield 28.4 mg. of colorless prisms of d:l-3:11:20-trioxo-18:18-ethylenedioxy-$\Delta^4$-17-isopregnene melting at 170–171.5° C.

What is claimed is:

1. A member selected from the group consisting of $\Delta^4$-3:11:20-trioxo-18:18-ethylenedioxy-17-iso-pregnene and its $\Delta^5$-3-ethylene-ketal.

2. The $\Delta^5$-3:3;18:18;20:20-trisethylenedioxy-11β-hydroxy-17-iso-pregnene.

3. The $\Delta^5$-3:3;18:18;20:20-trisethylenedioxy-11-oxo-17-iso-pregnene.

4. Process for the manufacture of 11:18-cyclohemiacetals of 11β-hydroxy-18:20-dioxo-pregnane compounds, wherein a 20-ketal of an 11:18:20-trioxo-pregnane compound is treated in an anhydrous non-acidic organic solvent with a strong acid, in the 11:20-dioxo-18-acetal obtained the 20-oxo group is ketalized, in the resulting compounds the 11-oxo-group is reduced to the 11β-hydroxyl group and in the compounds obtained the oxo groups in 18- and 20-position are liberated.

5. Process for the manufacture of 11β:18;18:20-cycloacetals of 11β:20-dihydroxy-18-oxo-pregnane compounds, wherein a 20-ketal of an 11:18:20-trioxo-pregnane compound is treated in an anhydrous non-acidic organic solvent with a strong acid, in the 11:20-dioxo-18-acetal obtained the oxo groups in 11- and 20-position are reduced to the hydroxyl group and in the compounds obtained the 18-oxo group is liberated.

6. Process as claimed in claim 4, wherein there is used a sulfonic acid as the strong acidic agent.

7. Process as claimed in claim 5, wherein there is used a sulfonic acid as the strong acidic agent.

References Cited by the Examiner
UNITED STATES PATENTS 2,841,531   7/1958   Wettstein et al. _____ 195—2
3,014,904   12/1961  Reichstein et al. _____ 260–239

Loewenthal Tetrahedron, Vol. 6, No. 4, pages 269–303, pages 287–290 relied on, June 1959.

LEWIS GOTTS, *Primary Examiner.*